United States Patent [19]
Weber et al.

[11] Patent Number: 6,043,576
[45] Date of Patent: Mar. 28, 2000

[54] ELECTRIC MOTOR

[75] Inventors: Matthias Weber, Baden-Baden; Guenther Riehl, Buehlertal; Kurt Schindler, Achern; Olaf Bock, Buehl, all of Germany

[73] Assignee: Robert Bosch GmbH, Stuttgart, Germany

[21] Appl. No.: 09/155,684

[22] PCT Filed: Jan. 12, 1998

[86] PCT No.: PCT/DE98/00083

§ 371 Date: Oct. 2, 1998

§ 102(e) Date: Oct. 2, 1998

[87] PCT Pub. No.: WO98/35427

PCT Pub. Date: Aug. 13, 1998

[30] Foreign Application Priority Data

Feb. 6, 1997 [DE] Germany ............................ 197 04 472

[51] Int. Cl.[7] .................................................. H02K 11/00
[52] U.S. Cl. ...................... 310/68 B; 310/242; 310/246; 310/248; 310/249; 310/239
[58] Field of Search .................. 310/68 B, 242, 310/246, 248, 249, 239

[56] References Cited

U.S. PATENT DOCUMENTS

| | | | |
|---|---|---|---|
| 4,329,605 | 5/1982 | Angi et al. | 310/68 R |
| 4,475,053 | 10/1984 | Mayer | 310/239 |

FOREIGN PATENT DOCUMENTS

| | | | |
|---|---|---|---|
| 4238375A1 | 5/1994 | Germany | H02K 11/00 |

*Primary Examiner*—Nestor Ramirez
*Assistant Examiner*—Saeed Ghahramani
*Attorney, Agent, or Firm*—Michael J. Striker

[57] ABSTRACT

An electric motor with a sensor, in particular an rpm sensor, is proposed. The sensor contains at least one means (20), generating a magnetic field, as the signal emitter, at least one magnetic field sensor (28, 30) as the signal receiver, and signal conducting means (22, 24, 26). The signal conducting means (22, 24, 26) contain magnetically conducting material and conduct the signal of the at least one magnetic field-generating means (20) to the at least one magnetic field sensor (28, 30). At least one current conducting means (40, 42, 44) is arranged essentially along the signal conducting means (22, 24, 26).

14 Claims, 4 Drawing Sheets

ELECTRIC MOTOR

BACKGROUND OF THE INVENTION

Electric motors with a magnetic pole wheel arranged on the motor armature shaft, fixed against relative rotation, as the signal emitter, and with an associated signal receiver fixed in place on the housing, are commonly known prior art. Signal emitter and signal receiver act together as a sensor in order to detect, for example, the direction of rotation, rpm, speed of the motor armature shaft and other parameters of the motor operation.

SUMMARY OF THE INVENTION

In accordance with the present invention, the signal conducting means contain magnetically conducting material and conduct the signal of the at least one magnet field-generating means to the at least one magnetic field sensor, and the at least one current conducting means are arranged essentially along the signal conducting means.

The electric motor in accordance with the present invention has the advantage that the magnetic field sensor can be arranged remote from the means generating the magnetic field, but still dependably detects the magnetic field of the magnetic field-generating means. By the arrangement of the signal conducting means essentially along the current conducting means, the field conducted to the magnetic field sensor is affected not at all or only minimally by the magnetic field of the current flowing in the current conducting means if, the effective magnetizing direction, i.e. the magnetization generated by the magnetic field-generating means, extends along the signal conducting means. Tests which have been conducted have shown that, for example in the course of operating customary commercial small motors at currents of approximately 30 A, the magnetic field accompanying the currents has a flow density of an order of magnitude of 20 mT. This interference field can-in particular when the electric motor is switched on-lead to false measurements in the magnetic field sensor. Such false measurements are prevented by the arrangement in accordance with the invention.

In accordance with an embodiment of the invention, the current conducting means and the signal conducting means respectively are constituted as individual components. The two components can be arranged in a sandwich structure, for example. Since the current conducting means are essentially arranged along the signal conducting means, the lines of flux of the field accompanying the signal conducting means extend perpendicularly in respect to the effective magnetizing direction. In this case it is possible, with a suitable magnetic field sensor selection and arrangement, to specifically evaluate the effective magnetic field without the superimposition of interference fields.

In another embodiment of the invention, the current conducting means are arranged on the surface of the signal conducting means. Since the current conducting means enclose the signal conducting means almost completely, the magnetic field accompanying the current flow is vanishingly small in the interior of the signal conducting means (Faraday cage effect). Therefore there is hardly any interference with the effective magnetic field in the signal conducting means.

Further advantageous further embodiments and designs of the invention ensue from the further dependent claims and from the exemplary embodiments.

DESCRIPTION OF THE PREFERRED EMBODIMENTS

Figure 1A:
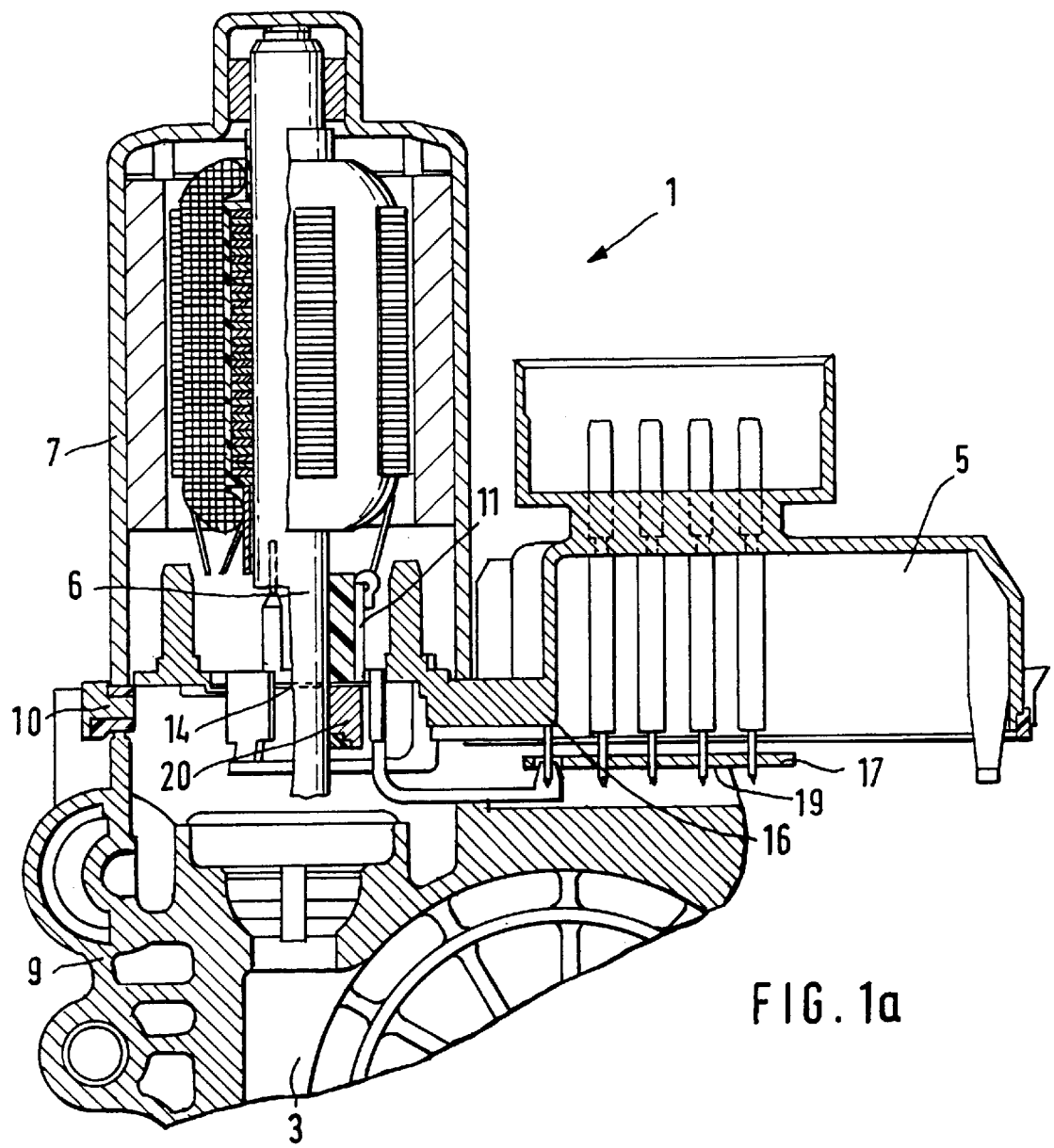
FIG. 1a shows an electric motor in accordance with the invention in a partially sectional view, FIG. 1b a portion, rotated by 180° C. in respect to FIG. 1a, of a brush holder of the electric motor in FIG. 1.
Figure 1B:
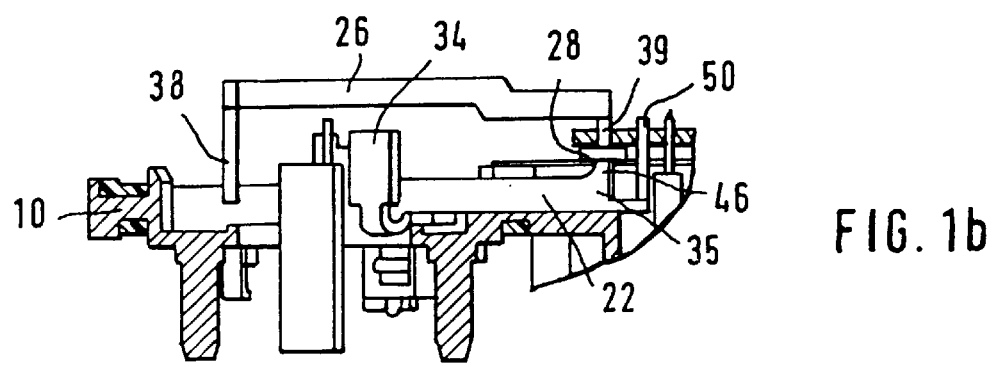

FIGS. 1a and 1b show an electric motor 1 in accordance with the invention with a downstream connected gear 3 and an electronic housing 5. A motor armature shaft 6 has been extended into the gear 3. A brush holder 10 is arranged between a motor housing 7 and a gear housing 9. As can be seen from FIG. 2, insertion devices 12 (for the sake of clarity only one of actually two insertion devices provided is shown) for carbon brushes, not represented, are arranged on the brush holder 10, which are in electrical contact with a commutator 11 arranged on the motor armature shaft. The brush holder 10 consists of a brush element 14 and an electronic element 16 with an electronic plate 17. While the brush element 14 is arranged between the motor housing 7 and the gear housing 9, the electronic element 16 protrudes out of the motor housing 7 into the electronic housing 5. An electronic motor output and control device 19 is integrated onto the electronic plate 17.

A magnetic pole ring 20 which forms magnetic field generating means is arranged on the motor armature shaft 6. Respectively one half of the pole ring 20 constitutes a north pole, the other a south pole. Three magnetic conductors 22, 24 and 26 are arranged on the brush holder 10, which extend from the brush element 14 into the electronic element 16. Two Hall sensors 28 and 30 in the form of integrated circuits are arranged on the electronic element 16 of the brush holder 10 as magnetic field sensors.

The magnetic conductors 22, 24 and 26 have taps 34, 36 and 38, which receive the signal of the pole ring 20 as the magnetic field-generating means. In the case of the magnetic conductors 22 and 24, the respective taps are located at the one end, in the case of the magnetic conductor 26 approximately in the center of the component. Projections 46, or respectively at the other end 35, or respectively of the magnetic conductors 22, or respectively 24 are arranged on the electronic plate 17 in front of the Hall sensors 28, or respectively 30. The two ends 39, 39' of the magnetic conductor 26 extend through bores in the electronic plate 17 underneath the Hall sensors 28, or respectively 30; the fronts of the ends 39, 39' are arranged directly at the underside of the Hall sensors 28 and 30. By means of this arrangement, the magnetic conductors 22 and 26, as well as 24 and 26, respectively form an almost completely closed magnetic circle, and the Hall sensors 28 and 30 are almost completely penetrated by the effective magnetic flux caused by the pole ring 20.

The transmission of the magnetic signals from the pole ring 20 to the Hall sensors 28 and 30 will be described by means of the example of the magnetic conductor 22: the magnetic field of the segment of the pole ring 20 which is spatially closest to the tap 34 magnetizes the tap 34, and therefore the entire magnetic conductor. Thus, it is conducted to the end 35 of the magnetic conductor 22 which is located opposite the tap. Since the end 35 of the magnetic conductor 22 is arranged directly in front of the Hall sensor 28 on the electronic plate 17, the Hall sensor 28 therefore detects the magnetic field of the pole ring 20, even though it is spatially remote from the pole ring 20.

The Hall sensors 28 and 30 convert the signals transmitted through the magnetic conductors 22, 24 and 26 into digital signals. The electronic motor control device 19 evaluates the digital signals to determine the rpm, the direction of rotation, the acceleration and other parameters of the motor armature shaft with the help of a program-controlled micro-processor or micro-controller.

Respectively one current conducting means 40 and 42 is arranged along the magnetic conductors 22 and 24, which essentially extends parallel with the magnetic conductors 22, or respectively 24.

Figure 2:
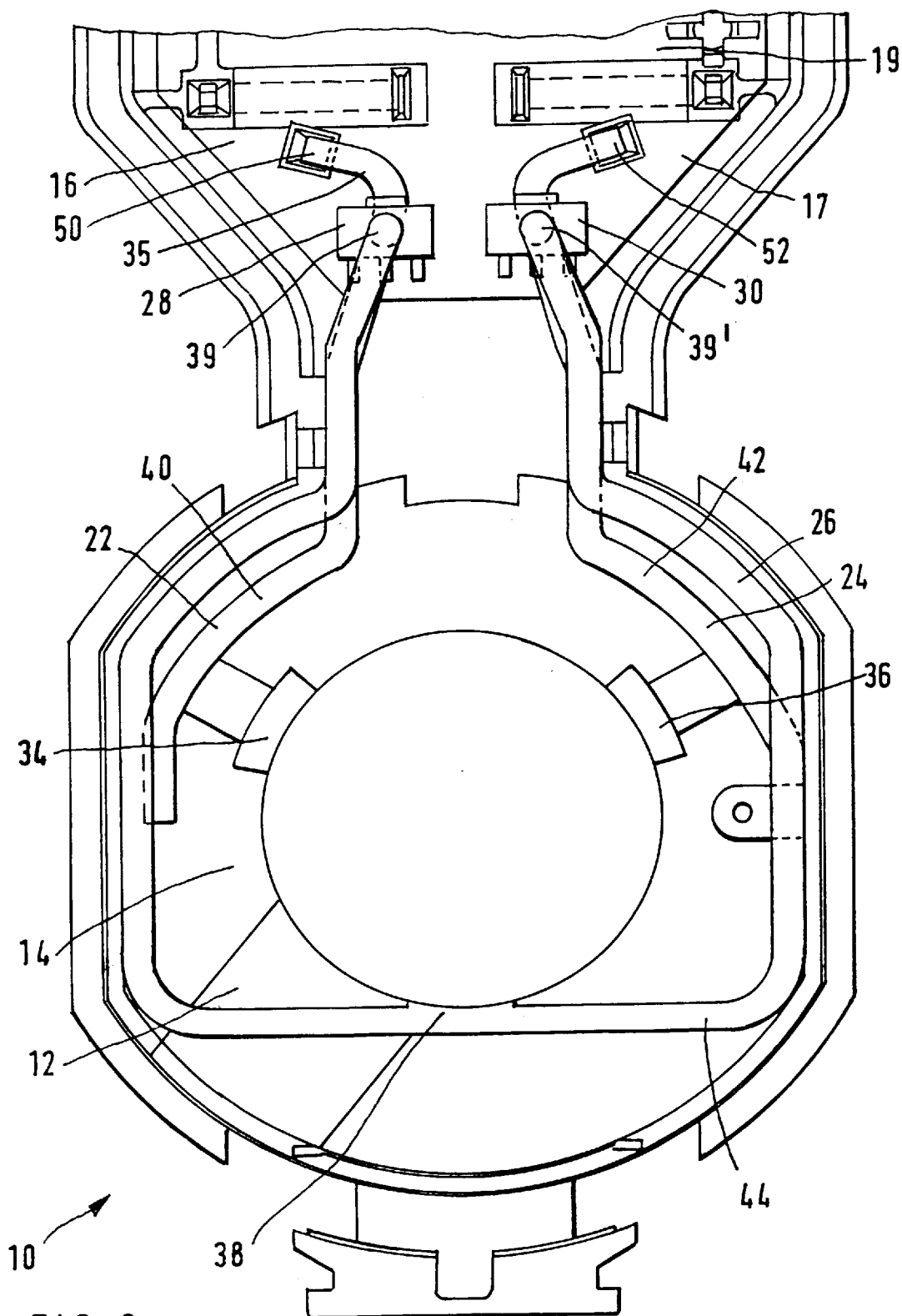
FIG. 2 shows the brush holder of the electric motor of the invention in a view from above.
Figure 3A:
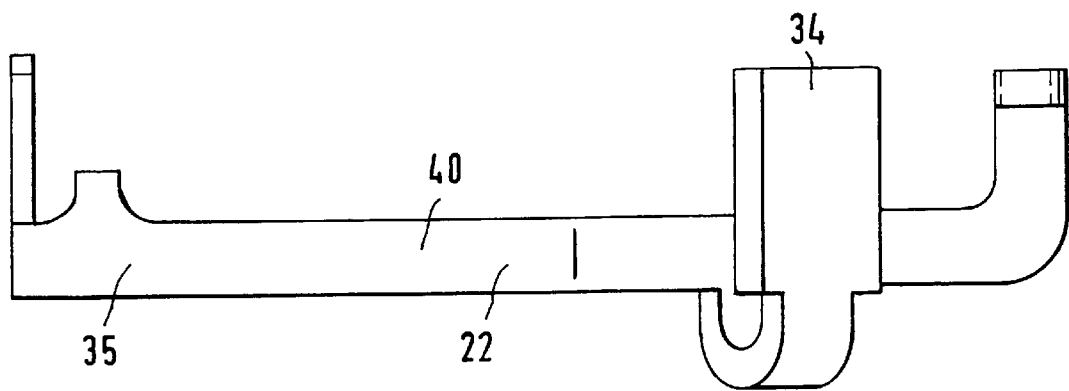
FIG. 3a shows a first exemplary embodiment of a current conductor arranged along a signal conducting means in a view from above.
Figure 3B:
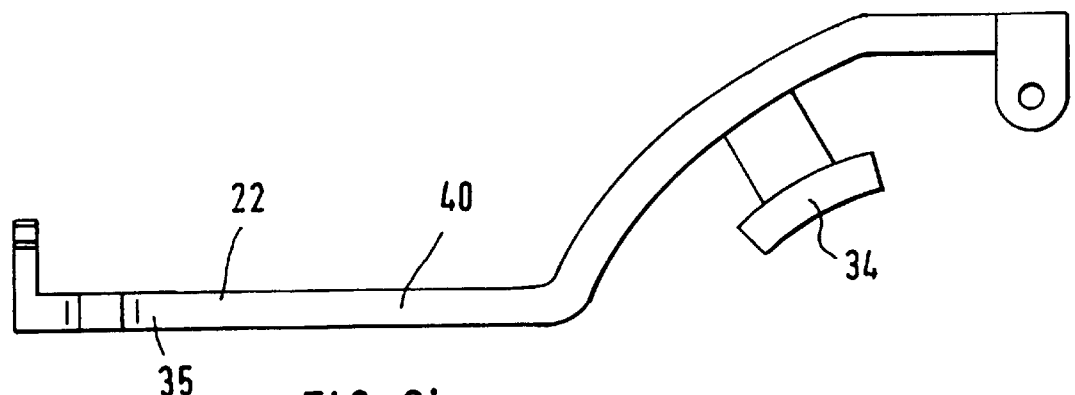
FIG. 3b shows the first exemplary embodiment in a lateral view.

In a first exemplary embodiment, represented in FIGS. 3a and 3b and realized in the arrangement according to FIGS. 1a, 1b and 2, the current conducting means 40 have been applied to the magnetic conducting means 22. The magnetic conducting means 22 consist of steel of low magnetic retentivity and high permeability, for example steel in accordance with DIN ST1203. In this embodiment, the current conducting means 40 made of copper have been galvanically deposited on the magnetic conducting means. However, they can also be applied by vacuum evaporation or arranged on the surface of the magnetic conducting means by another method. To improve conductivity, a tin layer of such a strength that the resistance of the current conducting means 40 is low in comparison with the resistance of the armature windings, has been applied to the galvanically deposited relatively thin copper layer.

The opposite arrangement is of course also conceivable, i.e. that the magnetic conducting means 22 are arranged on the surfaces of compact current conducting means.

The current conducting means 40 are connected in an electrically conducting manner with a first brush of the brush holder 10, the current conducting means 42 with a second brush of the brush holder 10.

The end 50, or respectively 52 of the current conducting means 40, 42, which is respectively facing away from the brushes, has been led to the electronic motor output device on the electronic plate 17. Thus, the first and second brush are supplied with current via the current conducting means 40, or respectively 42.

The magnetic conductor 26 is also sheathed in current conducting means 44. The current conducting means 44 are in electrical contact with the electrical ground of the motor and in this way shield the magnetic conductor 26 to a large extent from externally arriving interference signals.

Figure 4A:
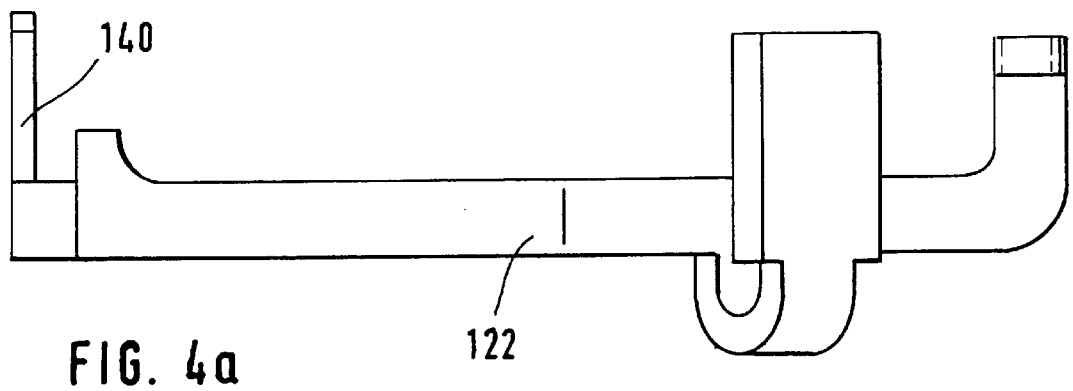
FIG. 4a shows a second exemplary embodiment of a signal conducting means and a current conducting means in a view from above.
Figure 4B:
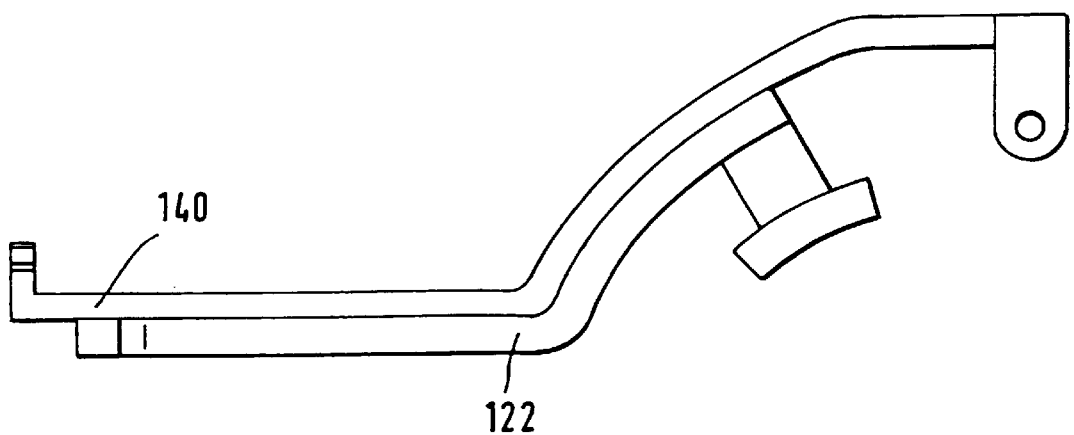
FIG. 4b shows the second exemplary embodiment in a lateral view.

A second embodiment of the current conducting means and of the magnetic conductor is represented in greater detail in FIGS. 4a and 4b. The current conducting means 140 and the magnetic conducting means 122 are each individual components. A sprayed skin of plastic, which is already sprayed on when the brush holder is manufactured, has been applied between the two components for electrical insulation. The current conducting means 140 are made completely of copper, but can also be made from another, electrically well conducting material, for example brass. As in the first exemplary embodiment, the magnetic conductor is made of steel. Both components are produced by means of stamping methods and are bent into the shape represented in FIG. 4a and FIG. 4b after stamping.

We claim:

1. An electric motor with a sensor, in particular an rpm sensor, containing at least one magnetic field generating means (20), generating a magnetic field, as the signal emitter, at least one magnetic field sensor (28, 30) as the signal receiver, and signal conducting means (22, 24, 26), characterized in that the signal conducting means (22, 24, 26) contain magnetically conducting material and conduct the signal of the at least one magnetic field-generating means (20) to the at least one magnetic field sensor (28, 30), and that at least one current conducting means (40, 42, 44) are arranged essentially along the signal conducting means (22, 24, 26).

2. The electric motor in accordance with claim 1, characterized in that the at least one current conducting means (140) and the at least one signal conducting means (122) are arranged parallel with each other.

3. The electric motor in accordance with claim 1, characterized in that the at least one current conducting means (140) and the at least one signal conducting means (122) extend without spacing next to each other.

4. The electric motor in accordance with claim 1, characterized in that at least one electrically insulating means is arranged between the current conducting means and the signal conducting means.

5. The electric motor in accordance with claim 1, characterized in that the current conducting means (140) and the signal conducting means (122) each constitute separate components.

6. The electric motor in accordance with claim 1, characterized in that the current conducting means (40, 42, 44) have been applied to the surface of the signal conducting means (22, 24, 26).

7. The electric motor in accordance with claim 6, characterized in that the current conducting means (40, 42, 44) have been galvanically deposited on the surface of the signal conducting means (22, 24, 26).

8. The electric motor in accordance with claim 1, characterized in that the current conducting means (40, 140) are made of copper and the signal conducting means (22, 122) of magnetically conductive steel.

9. The electric motor in accordance with claim 1, characterized in that the at least one current conducting means (40, 42) carry an operating current of the electric motor (1).

10. The electric motor in accordance with claim 9, characterized in that the at least one current conducting means (40, 42) are connected with brushes of the electric motor (1).

11. The electric motor in accordance with claim 1, characterized by a brush holder (10), on which the at least one signal receiver is arranged.

12. The electric motor in accordance with claim 1, characterized by a Hall sensor (28, 30) as the signal receiver.

13. The electric motor in accordance with claim 1, characterized in that the magnetic field generator (28, 30) is arranged spatially remote from the field-generating means (20).

14. The electric motor in accordance with claim 1, characterized in that the magnetic field sensor (28, 30) is arranged on an electronic plate (17).

* * * * *